(12) United States Patent
Baek et al.

(10) Patent No.: US 11,659,565 B2
(45) Date of Patent: May 23, 2023

(54) METHOD AND APPARATUS OF RETRANSMISSION USING ADJACENT CONFIGURED GRANT RESOURCE IN WIRELESS COMMUNICATIONS SYSTEMS

(71) Applicant: Samsung Electronics Co., Ltd., Suwon-si (KR)

(72) Inventors: Sangkyu Baek, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 16/952,449

(22) Filed: Nov. 19, 2020

(65) Prior Publication Data

US 2021/0153173 A1 May 20, 2021

Related U.S. Application Data

(60) Provisional application No. 62/938,124, filed on Nov. 20, 2019.

(51) Int. Cl.

| | | |
|---|---|---|
| *H04W 72/04* | (2023.01) | |
| *H04L 1/18* | (2023.01) | |
| *H04W 72/12* | (2023.01) | |
| *H04W 72/14* | (2009.01) | |
| *H04W 72/23* | (2023.01) | |
| *H04L 1/1867* | (2023.01) | |
| *H04W 72/566* | (2023.01) | |
| *H04L 1/1812* | (2023.01) | |

(52) U.S. Cl.
CPC .......... *H04W 72/23* (2023.01); *H04L 1/1887* (2013.01); *H04W 72/569* (2023.01); *H04L 1/1819* (2013.01)

(58) Field of Classification Search
CPC ........... H04W 72/042; H04W 72/1242; H04W 72/14; H04W 72/1289; H04W 24/02; H04W 72/10; H04L 1/1887; H04L 1/1819; H04L 1/1822; H04L 1/1874; H04L 5/0044; H04L 5/0064; H04L 1/1812; H04L 1/1835
See application file for complete search history.

(56) References Cited

U.S. PATENT DOCUMENTS

| | | |
|---|---|---|
| 2019/0042944 A1 | 2/2019 | Nair et al. |
| 2019/0182896 A1 | 6/2019 | Shrestha et al. |
| 2019/0215717 A1* | 7/2019 | Lee ....................... H04W 24/10 |

FOREIGN PATENT DOCUMENTS

WO  2019-028276 A1  2/2019

OTHER PUBLICATIONS

CATT, 3GPP TSG-RAN WG2 Meeting #108, Reno, USA, Nov. 18-22, 2019, R2-1914412 (Year: 2019).*

(Continued)

*Primary Examiner* — Shailendra Kumar
(74) *Attorney, Agent, or Firm* — Jefferson IP Law, LLP

(57) ABSTRACT

A communication method and a system for converging a 5th generation (5G) communication system for supporting higher data rates beyond a 4th generation (4G) system with an Internet of things (IoT) technology are provided. The communication method includes intelligent services based on the 5G communication technology and the IoT-related technology, such as smart home, smart building, smart city, smart car or connected car, healthcare, digital education, retail, security and safety-related services.

6 Claims, 12 Drawing Sheets

(56) References Cited

OTHER PUBLICATIONS

Huawei, HiSilicon, SIA, UE autonomous transmission in a CG resource for deprioritized data, 3GPP TSG-RAN WG2 Meeting#108, Reno, USA, Nov. 18-22, 2019, R2-1914783. (Year: 2019).*
CATT, Leftoverissues for CG/CG and CG/DG prioritization, 3GPP TSG-RAN WG2 Meeting #106, Reno, USA, May 13-May 17, 2019, R2-1905748 (Year: 2019).*
CATT, Prioritization rules for CG&DG and CG&CG collisions, 3GPP TSG-RAN WG2 Meeting #105bis, Xi'an, China, Apr. 8-12, 2019, R2-19031430. (Year: 2019).*
CATT , 'Handling of Dropped MAC PDU', R2-1914412, 3GPP TSG-RAN2 Meeting #108, Reno, USA, Nov. 8, 2019.
Samsung, 'Transmission of Deprioritized Data by Retransmission Grant', R2-1916221, 3GPP TSGRAN2 Meeting #108, Reno, USA, Nov. 8, 2019.
Oppo, 'Consideration on UE autonomous retxforthe deprioritized MAC PDU', R2-1915095, 3GPP TSGRAN2 Meeting #108, Reno, USA, Nov. 8, 2019.
International Search Report dated Feb. 22, 2021, issued in International Application No. PCT/KR2020/016400.

Huawei et al.: "UE autonomous transmission in a CG resource for deprioritized data", 3GPP Draft; R2-1914783, 3rd Generation Partnership Project (3GPP), Mobile Competence Centre; 650, Route Des Lucioles ; F-06921 Sophia-Antipolis Cedex; France, vol. RAN WG2, No. Reno, USA; Nov. 18, 2019-Nov. 22, 2019 Nov. 7, 2019 (Nov. 7, 2019), XP051815755.
CATT: "Leftover issues for CG/CG and CG/DG prioritization", 3GPP Draft; R2-1905748 Leftover Issues for CGCG and CGDG Prioritization, 3RD Generation Partnership Project (3GPP), Mobile Competence Centre ; 650, Route Des Lucioles ; F-06921 Sophia-Antipolis Cedex, vol. RAN WG2, No. Reno, USA; May 13, 2019-May 17, 2019 May 3, 2019 (May 3, 2019), pp. 1-4, XP051710102.
CATT: "Prioritization rules for CG&DG and CG&CG collisions", 3GPP Draft; R2-1903143—Prioritization Rules for CG&DG and CG&CG Collisions, 3rd Generation Partnership Project (3GPP), Mobile Competence Centre ; 650, Route Des Lucioiles ; F-06921 Sophia-Antipolis Ced, vol. RAN WG2, No. Ki'an, China; Apr. 8, 2019-Apr. 12, 2019 Apr. 6, 2019 (Apr. 6, 2019), XP051700497.
European Search Report dated Dec. 1, 2021, issued in European Application No. 20878040.3.

* cited by examiner

METHOD AND APPARATUS OF RETRANSMISSION USING ADJACENT CONFIGURED GRANT RESOURCE IN WIRELESS COMMUNICATIONS SYSTEMS

CROSS-REFERENCE TO RELATED APPLICATION(S)

This application is based on and claims priority under 35 U.S.C. § 119(e) of a U.S. Provisional application Ser. No. 62/938,124, filed on Nov. 20, 2019, in the U.S. Patent and Trademark Office, the disclosure of which is incorporated by reference herein in its entirety.

BACKGROUND

1. Field

The disclosure relates to a method and an apparatus. More particularly, the disclosure relates to terminal and base station operations in a mobile communication system.

2. Description of Related Art

To meet the increasing demand for wireless data traffic since the commercialization of 4th generation (4G) communication systems, efforts have been made to develop an improved 5th generation (5G) or pre-5G communication system. Therefore, the 5G or pre-5G communication system is also called a "beyond 4G network" communication system or a "post LTE System." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multicarrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation, therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to 5G communication technology. Application of a cloud radio access network (cloud RAN) as the above-described big data processing technology may also be considered to be an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for more efficiently transmitting data of a low priority in case of collision between configured grants.

Additional aspects will be set forth in part in the description which follows and, in part, will be apparent from the description, or may be learned by practice of the presented embodiments.

In accordance with an aspect of the disclosure, a method of a terminal in a wireless communication system is provided. The method includes receiving configuration information on a configured grant (CG), determining whether a first medium access control (MAC) protocol data unit (PDU) has been transmitted at a first timing related to the configuration information on the CG, and transmitting data corresponding to the first MAC PDU at a second timing.

In accordance with another aspect of the disclosure, a terminal in a wireless communication system is provided. The terminal includes a transceiver configured to transmit and receive signals, and a controller or processor configured to control to receive configuration information on a CG, determine whether a first MAC PDU has been transmitted at a first timing related to the configuration information on the CG, and control to transmit data corresponding to the first MAC PDU at a second timing, in case that the first MAC PDU is not transmitted at the first timing.

According to an embodiment of the disclosure, it is possible to obtain (generate) a MAC PDU remaining in a hybrid automatic repeat request (HARQ) buffer of an HARQ process for a previous configured grant transmission time as a MAC PDU about the HARQ buffer of the HARQ process for a current configured grant transmission time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
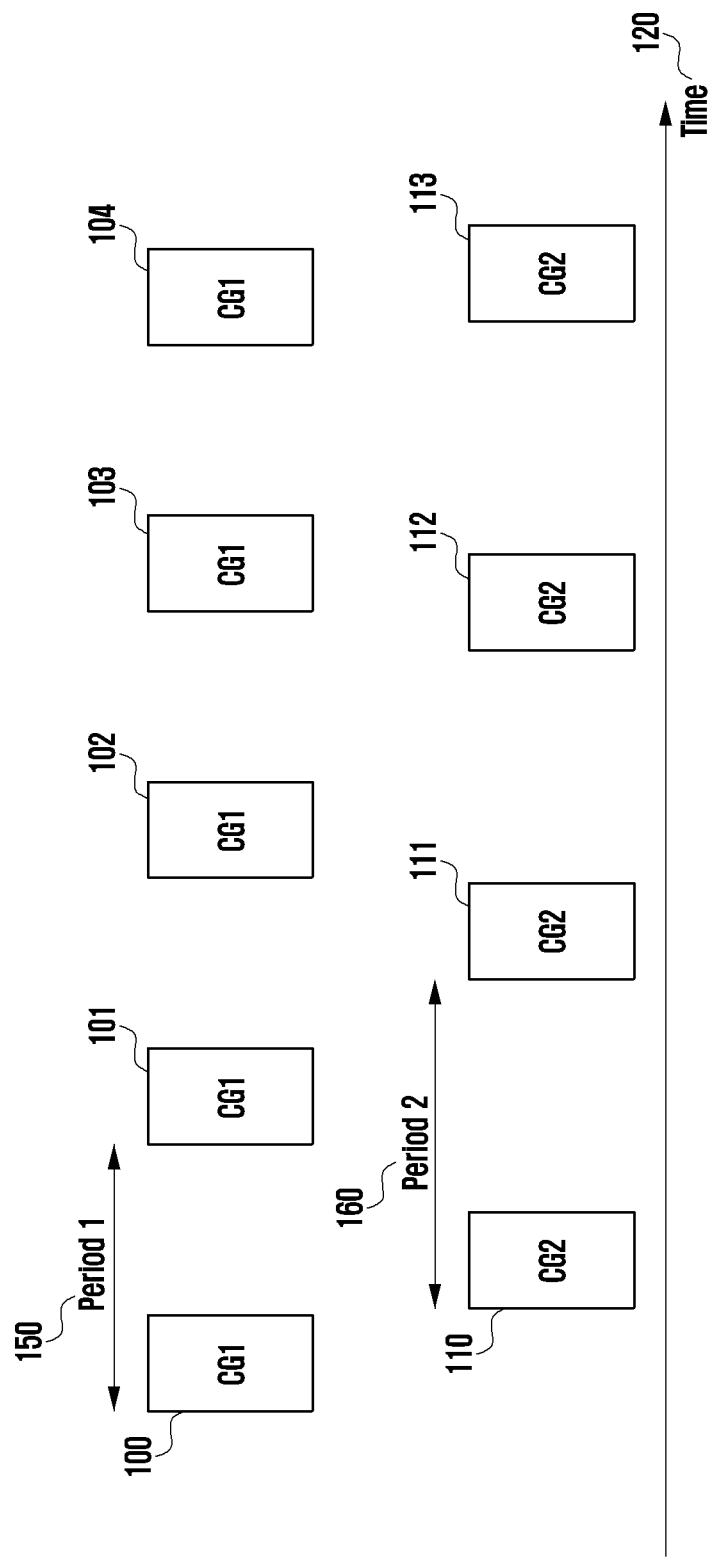
FIG. 1 illustrates an operation method of a configured grant according to an embodiment of the disclosure.

The following description with reference to the accompanying drawings, is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable data processing apparatus to produce a computer implemented process such that the instructions that execute on the computer or other programmable data processing apparatus provide operations for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means a software or hardware component, such as field programmable gate array (FPGA) or application-specific integrated circuit (ASIC), which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "~units" may be combined into fewer components and "~units" or further separated into additional components and "~units". Further, the components and "~units" may be implemented to operate one or more central processing units (CPUs) in a device or a security multimedia card.

In describing the disclosure, a detailed description of a related known function or configuration will be omitted if it is deemed to make the gist of the disclosure unnecessarily vague. Hereinafter, embodiments of the disclosure will be described with reference to the accompanying drawings.

FIG. 1 illustrates an operation method of a configured grant according to an embodiment of the disclosure. In a wireless communication system, a base station may determine which radio resource a terminal is to use and send, and may use a method for allocating the resource. As such a resource allocation method, there are dynamic scheduling allocating a resource to be used for each slot, subslot, frame, or subframe, which is a basic unit to use the resource on a time axis, and configured scheduling notifying of commonly used configurations including a period of a useable resource. A radio resource allocated in a configured scheduling method may refer to a configured grant (CG), and the configured grant may be configured by transmission of a radio resource control (RRC) message that a base station transmits to a terminal. Information that can be configured by the RRC message may be frequency hopping configuration, demodulation reference signal (DMRS) configuration, modulation and coding scheme (MCS) table to be used, resource allocation type, whether to use a power control loop, repetition or not, periodicity, configured grant timer value, antenna port, MCS index, frequency hopping offset, time domain offset, time domain allocation, and the like. Further, the corresponding information may be included in a configured grant config in the RRC message.

Referring to FIG. 1, a situation in which two configured grants of a first configured grant CG1, 100, 101, 102, 103, and 104 and a second configured grant CG2, 110, 111, 112, and 113 are configured. As illustrated, it is possible to configure a plurality of configured grants in the same terminal, in the same cell, or in the same bandwidth part (BWP). The respective configured grants may have periods 150 and 160 configured on a time axis 120 by an RRC message, and configured grant resources may be repeated in accordance with the periods.

The configured grant has a first type configured grant and a second type configured grant in accordance with the characteristics thereof. The first type configured grant means a configured grant in which all configuration values of the corresponding configured grant are transferred through the RRC message, and there is no control of other base stations. The first type configured grant is a configured grant in which there is not a separate activation or deactivation procedure, and once being configured, the configuration is applied until being released. According to the second type configured grant, some configurations of the configured grant are transferred through the RRC message, and after the configuration, a base station may transfer an activation message to achieve actual activation. A terminal having received the activation message for the second type configured grant may transfer a configured grant confirmation message notifying that the corresponding configured grant has been activated to the base station. The configured grant confirmation message may have a control element (CE) type of a medium access control (MAC) layer. Further, the base station may also transfer a deactivation message to deactivate the second type configured grant. The terminal having received the deactivation message for the second type configured grant may transfer a confirmation grant confirmation message notifying that the configured grant has been deactivated to the base station.

Figure 2:
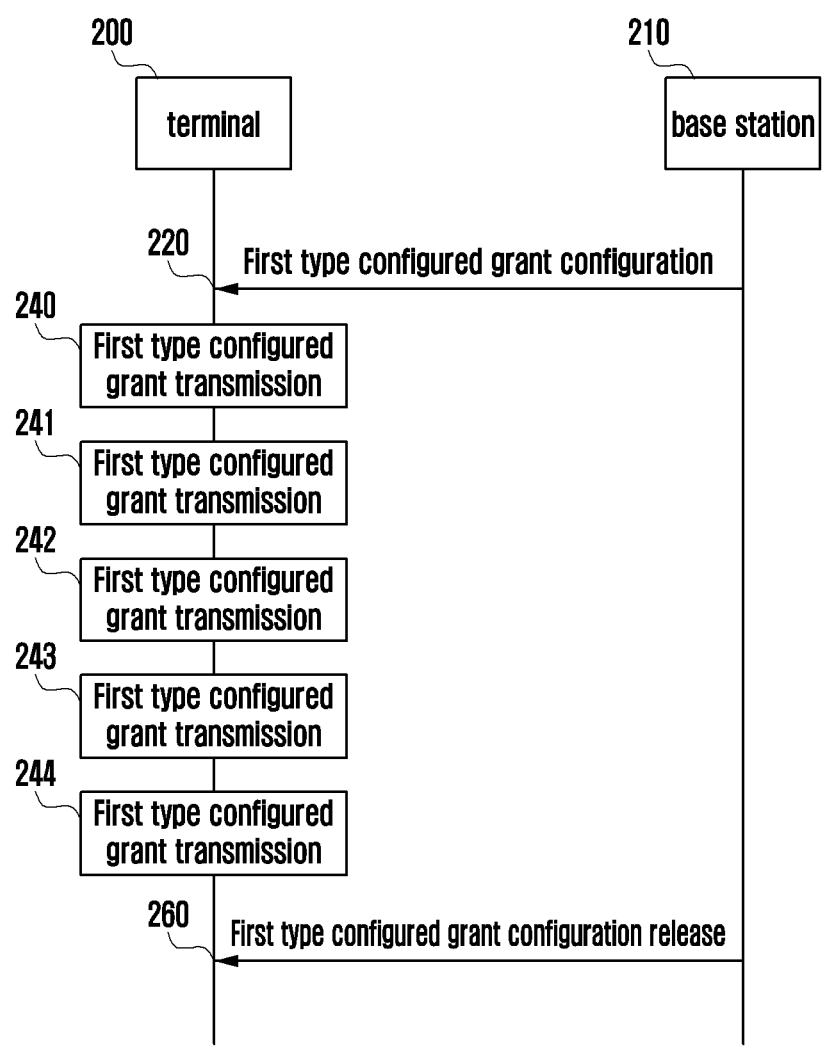
FIG. 2 illustrates a procedure in which a first type configured grant is configured and activated according to an embodiment of the disclosure.

FIG. 2 illustrates a procedure in which a first type configured grant is configured and activated according to an embodiment of the disclosure. A terminal 200 may receive an RRC message by a base station 210, and the RRC message may include configuration information of a first type configured grant (operation 220).

Referring to FIG. 2, the first type configured grant is configured in the corresponding terminal 200. Because the first type configured grant does not include a separate activation procedure, all configuration information necessary for resource usage should be included in the configuration message. Information included herein may be frequency hopping configuration to be used for the first type configured grant, demodulation reference signal (DMRS) configuration, modulation and coding scheme (MCS) table to be used, resource allocation type, whether to use a power control loop, repetition or not, periodicity, configured grant timer value, antenna port, MCS index, frequency hopping offset, time domain offset, time domain allocation, and the like. Also, a configured grant index, which is an identifier capable of identifying the configured first type configured grant may be included. The configured grant index may be used by the first type configured grant and the second type configured grant together. The configured grant index may be uniquely configured in a cell group, may be uniquely configured in a cell, or may be uniquely configured in a BWP. The information may be included in a configured grant config in the RRC message. The first type configured grant is configured and activated at the same time at operation 220, and thus data can be transmitted using a designated radio resource at a designated time (times 240, 241, 242, 243, and 244). In FIG. 2, it is considered that the first type configured grant resources can be sent five times in period, and this means that one resource is allocated for each configured period. Because the first type configured grant does not include a separate activation and deactivation procedure, it does not require a configured grant confirmation procedure. If there is no data to be transmitted in the configured grant allocated to the terminal, the terminal may perform a skipping operation in which the corresponding configured grant is not used and is not transmitted. The base station 210 may release the configured first type configured grant by sending a first type configured grant release message (operation 260) to the terminal at a time when it is determined that the first type configured grant configuration is not necessary any more.

Figure 3:
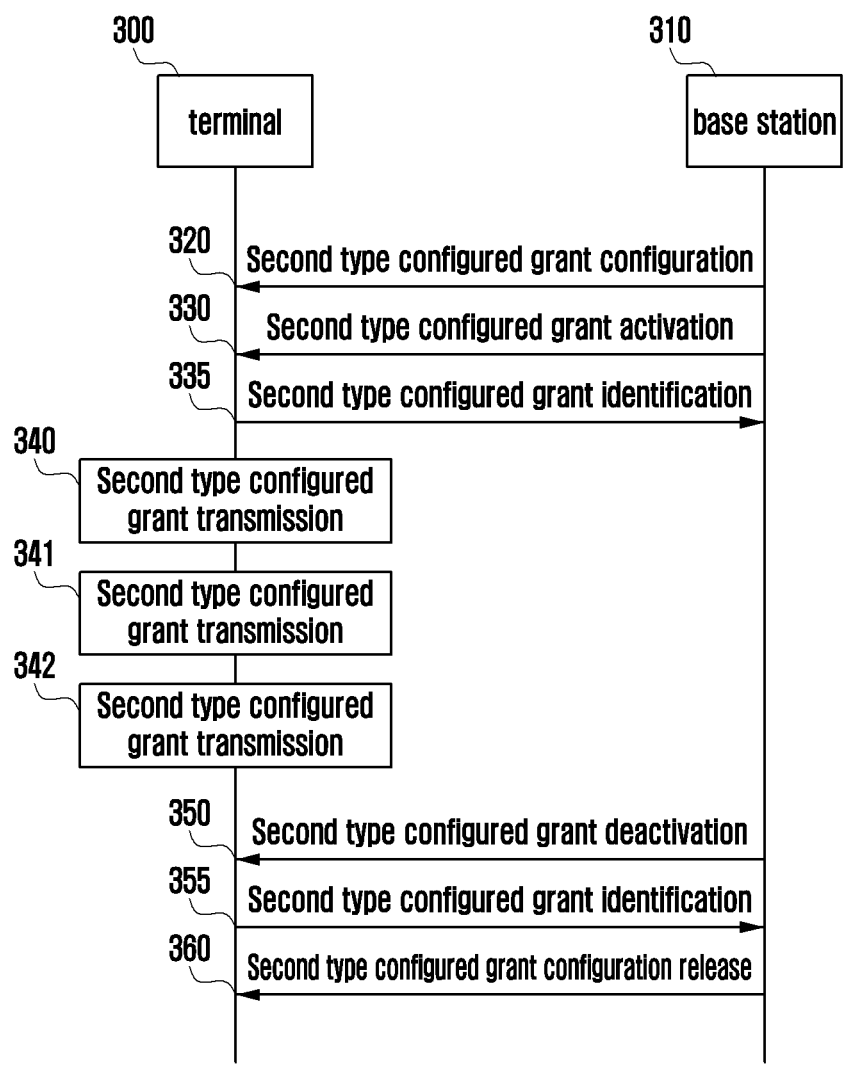
FIG. 3 illustrates a procedure in which a second type configured grant is configured and activated according to an embodiment of the disclosure.

FIG. 3 illustrates a procedure in which a second type configured grant is configured and activated according to an embodiment of the disclosure. A terminal 300 may receive an RRC message by a base station 310, and the RRC message may include configuration information of a second type configured grant (configuration message 320).

Referring to FIG. 3, the second type configured grant is configured in the corresponding terminal 300. Because the second type configured grant includes an activation procedure, only some configuration information necessary for resource usage can be included in the configuration message 320. Information included herein may be frequency hopping configuration to be used for the second type configured grant, demodulation reference signal (DMRS) configuration, modulation and coding scheme (MCS) table to be used, resource allocation type, whether to use a power control loop, repetition or not, periodicity, configured grant timer value, and the like. Also, a configured grant index, which is an identifier capable of identifying the configured second type configured grant may be included. The configured grant index may be used by the first type configured grant and the second type configured grant together. The configured grant index may be uniquely configured in a cell group, may be uniquely configured in a cell, or may be uniquely configured in a BWP. Such information may be included in a configured grant config in the RRC message. Although the second type configured grant is configured (configuration message 320), the corresponding resource is not actually allocated until activation instructions of the base station are made. After the second type configured grant is configured (configuration message 320), the base station may activate the second type configured grant 330 by transmitting a second type configured grant activation message to the terminal. Information capable of being included in the activation message may be an antenna port to be used for the second type configured grant, MCG index, frequency hopping offset, time domain offset, time domain allocation, and the like. After activating the second type configured grant of which the activation is instructed, the terminal may notify the base station of completion of the activation by transmitting the second type configured grant confirmation message to the base station 310 (operation 335). After the activation, the terminal may transmit the data using a designated radio resource at a designated time (operations 340, 341, and 342). In FIG. 3, it is considered that the second type configured grant resources can be sent three times in period, and this means that one resource is allocated for each configured period. If there is no data to be transmitted in the configured grant allocated to the terminal, the terminal may perform a skipping operation in which the corresponding configured grant is not used and is not transmitted. The base station 310 may instruct the terminal to deactivate the second type configured grant in case that the transmission using the second type configured grant is not necessary (operation 350), and the terminal may notify the base station that the instructed deactivation is completed by transmitting the second type configured grant confirmation message to the base station after deactivating the corresponding second type configured grant (operation 355). Further, the base station may release the configured second type configured grant by sending a second type configured grant release message 360 to the terminal at a time when it is determined that the second type configured grant configuration is not necessary any more.

Figure 4:
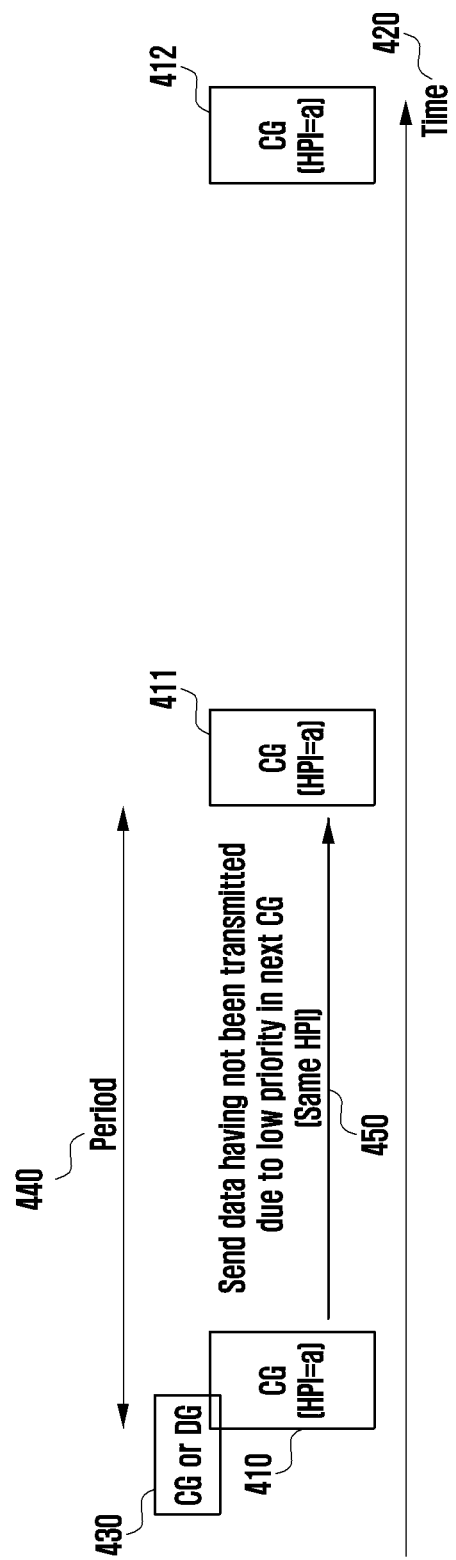
FIG. 4 illustrates a method for transmitting data of a low priority in case of collision proposed according to an embodiment of the disclosure.

FIG. 4 illustrates a method for transmitting data of a low priority in case of collision proposed according to the embodiment of the disclosure. In a certain embodiment, a configured grant resource 410 being configured may have a lower priority than the priority of another configured grant (CG) or dynamic grant (DG) resource 430, and thus may be unable to be transmitted. Such a collision of two grants may occur in case that the transmission times overlap each other on a time axis 420 or the same resource is used on the time and frequency axes. Also, the corresponding configured grant resource may occur even in case that the same resource is used on the time axis 420 or on the time and frequency axes with a scheduling request message. In case that the configured grant 410 has a low priority and is unable to be transmitted, and the data to be transmitted, that is, a MAC protocol data unit (PDU) has already been made in the configured grant, the MAC PDU may be transmitted in the next configured grant resource 411 corresponding to the same hybrid automatic repeat request (HARQ) process ID (HPI) (450) after configured grant period 440.

Referring to FIG. 4, it is considered that the HARQ process ID of the configured grant being unable to be transmitted is a (configured resource grant 410), and thus the data can be transmitted on the configured grant resource 411 of which the subsequent HARQ process ID is a.

Which resource is prioritized in case of collision between configured grant resources 410 and 430 shown in FIG. 4 may be determined by priorities representing the respective configured grant or dynamic grant resources. In a certain embodiment, this may be the highest priority value of the data included in the MAC PDU to be transmitted on the actual configured grant or dynamic grant resource. Accordingly, in case that the configured grant resource at operation 410 has a low priority and thus the data can be transmitted on the subsequent configured grant resource 411, the configured grant priority at operation 411 may be the highest priority value of the data included in the MAC PDU which was intended to be transmitted at operation 410, but has not been transmitted. According to embodiments, as the highest priority of the data included in the MAC PDU, the priority of a MAC CE may be considered together, or may not be considered.

Because the configured grant resources 410, 411, and 412 are considered as resources for initial transmission, a case that the MAC PDU is unable to be obtained just before the transmission of the configured grant may be considered as a case that the corresponding configured grant does not use the resource, and the HARQ buffer of the corresponding HARQ process may be emptied (flush). However, in case that the previous configured grant resource was unable to be transmitted due to its low priority, but the MAC PDU is stored in the HARQ buffer, it may be possible to transmit the MAC PDU without the necessity of performing the MAC PDU generation procedure. For this, considering that the MAC PDU is obtained for the transmission of the corresponding configured grant resource 411, it may be possible to perform the same procedure as the procedure for obtaining the MAC PDU. The operation described in the embodiment of FIG. 4 may be limited to be performed within the same configured grant configuration.

Figure 5:
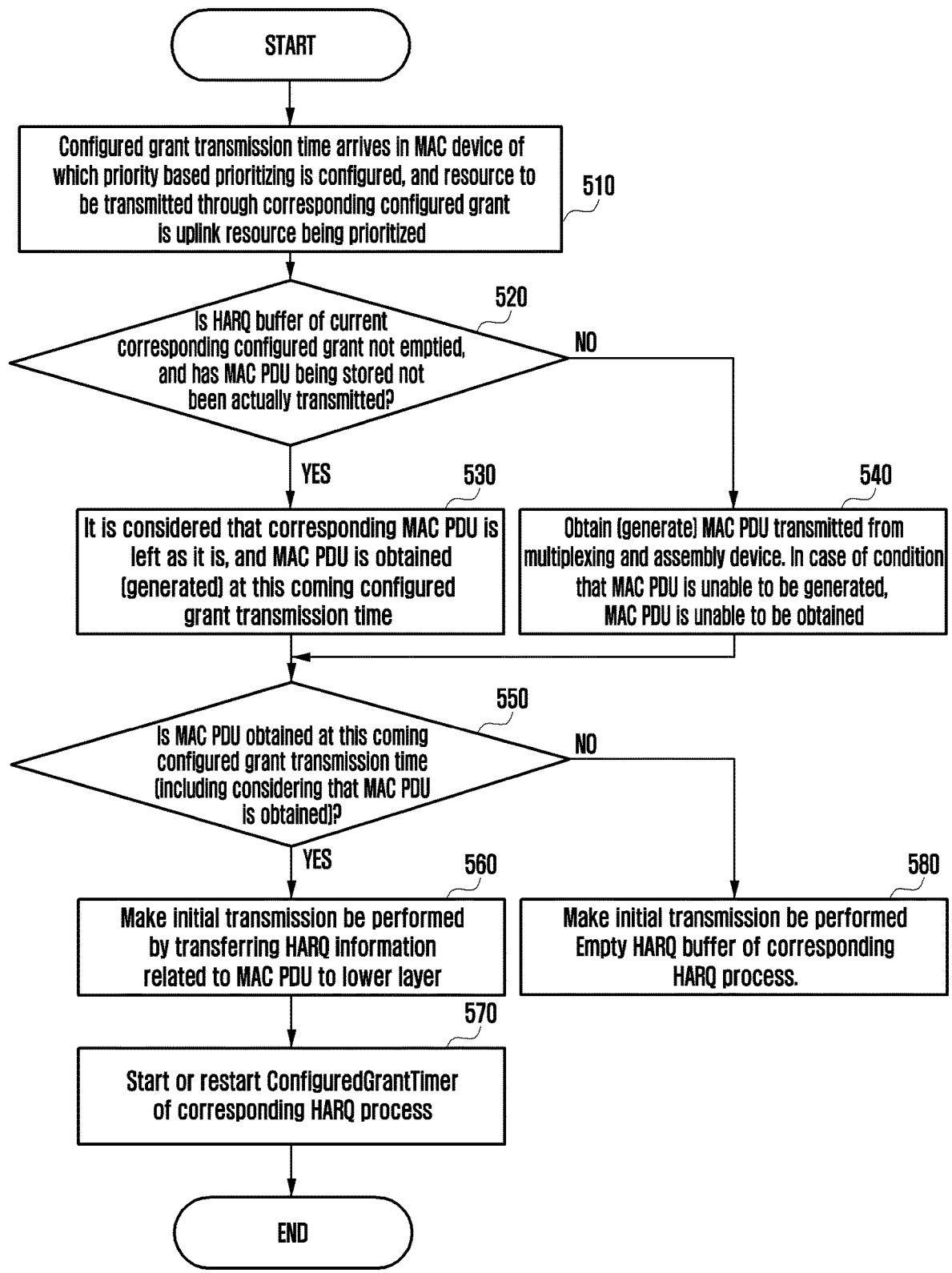
FIG. 5 illustrates a detailed procedure for transmitting data of a low priority in case of collision proposed according to an embodiment of the disclosure.

FIG. 5 illustrates a detailed procedure for transmitting data of a low priority in case of collision proposed according to the embodiment of the disclosure.

Referring to FIG. 5, as described above with reference to FIG. 4, it is considered to determine which resource is prioritized and transmitted based on the priority of the data to be transmitted on the corresponding resource when the resource collision occurs. This may be called a priority based prioritizing, and it is considered that the configured grant transmission time arrives in such a priority based configured MAC device, and the resource to be transmitted in the corresponding configured grant is an uplink resource being prioritized (510). Here, the prioritized uplink resource means that resources overlapping on the time axis or on the time and frequency axes exist, but the configured grant has a high priority, and thus the resource can be transmitted. Also, in case that the resource overlapping on the time axis or on the time and frequency axes does not exist, this may become the uplink resource being always prioritized.

In this case, it may be confirmed whether the existing MAC PDU, which is obtained and stored in a state where the HARQ buffer corresponding to the transmission time of the corresponding configured grant is not emptied, has not been actually transmitted (operation 520). Here, a case that the stored MAC PDU exists, but has not been actually transmitted may mean a case that the corresponding resource has a low priority and has not been transmitted after the obtaining of the MAC PDU. Further, the HARQ buffer at operation 520 may mean the HARQ buffer corresponding to the HARQ process ID at the transmission time of the corresponding configured grant.

If the condition at operation 520 is satisfied, this means that the MAC PDU, having been unable to be transmitted in the configured grant of the same HARQ process, exists, and in order to transmit the MAC PDU having been unable to be transmitted at this coming configured grant transmission time, it may be considered that the corresponding MAC PDU remaining in the HARQ buffer is left as it is, and the MAC PDU is obtained (generated) at this coming configured grant transmission time 530. According to embodiments, it may be considered that the same MAC PDU is generated again, and through such an operation, it may be possible to transmit the corresponding MAC PDU at the subsequent operation. If the condition at operation 520 is not satisfied, the MAC PDU transmitted from a multiplexing and assembly device may be obtained. In this case, in case of the condition on which the MAC PDU is unable to be generated, the MAC PDU is unable to be obtained 540.

Thereafter, the terminal may confirm whether to obtain the MAC PDU at this coming configured grant transmission time (550). In this case, whether to obtain the MAC PDU may include a case in which it is considered that the MAC PDU is obtained at operation 530. If so, the terminal may perform an initial transmission by transferring the HARQ information related to the MAC PDU to a lower layer 560. Further, because the corresponding resource is the configured grant resource, the terminal may not perform the initial transmission of the same HARQ process by starting or restarting a ConfiguredGrantTimer of the corresponding HARQ process 570. If the operation 550 is not satisfied, this means that the MAC PDU is unable to be obtained at this time, and thus the data transmission is unable to be performed. This is why the HARQ buffer of the corresponding HARQ process may be emptied 580. The operation described in the embodiment of FIG. 5 may be limited to being performed within the same configured grant configuration. Further, the embodiment of FIG. 5 may be limitedly applied to a case in which the number of HARQ processes configured in the configured grant configuration is 1.

Figure 6:
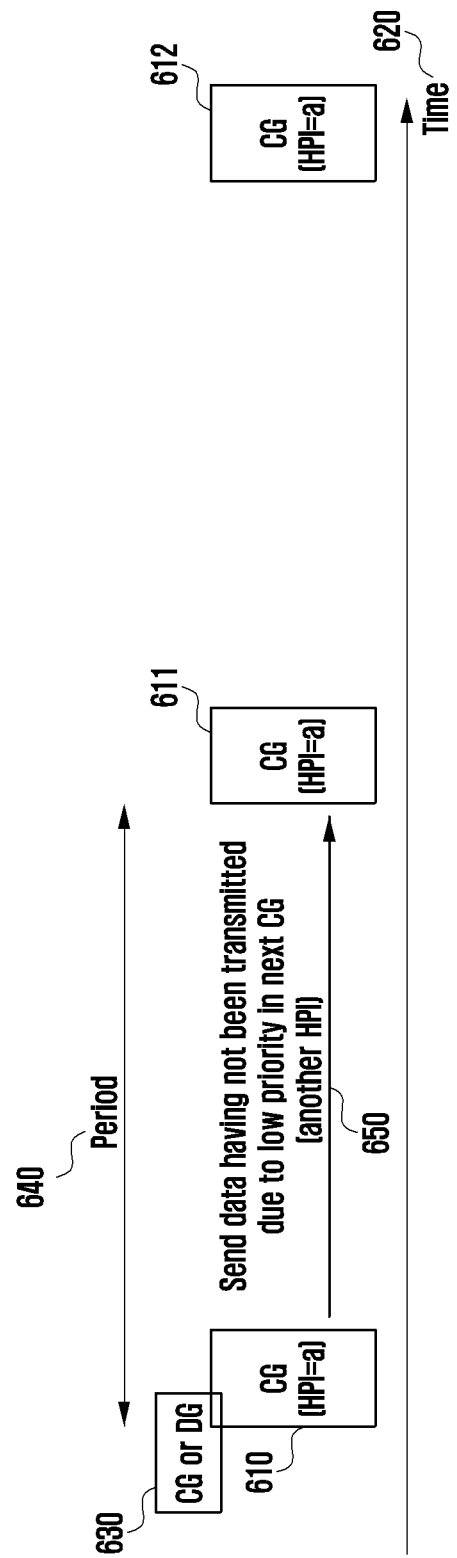
FIG. 6 illustrates a method for transmitting data of a low priority in case of collision proposed according to an embodiment of the disclosure.

FIG. 6 illustrates a method for transmitting data of a low priority in case of collision proposed according to the embodiment of the disclosure. In a certain embodiment, a configured grant resource 610 being configured may have a lower priority than the priority of another configured grant (CG) or dynamic grant (DG) resource 630, and thus may be unable to be transmitted. Such a collision of two grants may occur in case that the transmission times overlap each other on a time axis 620 or the same resource is used on the time and frequency axes. Also, the corresponding configured grant resource may occur even in case that the same resource is used on the time axis 620 or on the time and frequency axes with a scheduling request message. In case that the configured grant 610 has a low priority and thus is unable to be transmitted, and the data to be transmitted, that is, a MAC PDU has already been made in the configured grant, the MAC PDU may be transmitted in the next configured grant resource 611 of the corresponding configured grant configuration although HARQ process IDs (HPI) differ from each other (650) after configured grant period 640.

Referring to FIG. 6, it is considered that the HARQ process ID of the configured grant being unable to be transmitted is a 610, and thus the data can be transmitted on the configured grant resource 611 of which the subsequent HARQ process ID is b.

Which resource is prioritized in case of collision between configured grant resources 610 and 630 shown in FIG. 6 may be determined by priorities representing the respective configured grant or dynamic grant resources. In a certain embodiment, this may be the highest priority value of the data included in the MAC PDU to be transmitted on the actual configured grant or dynamic grant resource. Accordingly, in case that the configured grant resource at operation 610 has a low priority and thus the data can be transmitted on the subsequent configured grant resource 611, the configured grant priority at operation 611 may be the highest priority value of the data included in the MAC PDU which was intended to be transmitted at operation 610, but has not been transmitted. According to embodiments, as the highest priority of the data included in the MAC PDU, the priority of a MAC CE may be considered together, or may not be considered.

Because the configured grant resources 610, 611, and 612 are considered as resources for initial transmission, a case that the MAC PDU is unable to be obtained just before the transmission of the configured grant may be considered as a case that the corresponding configured grant does not use the resource, and the HARQ buffer of the corresponding HARQ process may be emptied (flush). However, in case that the previous configured grant resource 610 was unable to be transmitted due to its low priority, but the MAC PDU is stored in the HARQ buffer, the MAC PDU can be brought from the HARQ buffer of the HARQ process, in which the MAC PDU is stored, and can be stored in the HARQ buffer of the HARQ process for the current configured grant resource 611. This may be considered as a process in which the HARQ process of the current configured grant obtains (generates) the MAC PDU. In this case, the HARQ buffer of the previous configured grant resource 610, in which the existing MAC PDU is stored, may be emptied. If the HARQ buffer is emptied, retransmission to the corresponding HARQ process is not performed, and thus different HARQ processes can be prevented from performing the transmission of the same MAC PDU. The operation described in the embodiment of FIG. 6 may be limited to be performed within the same configured grant configuration.

Figure 7:
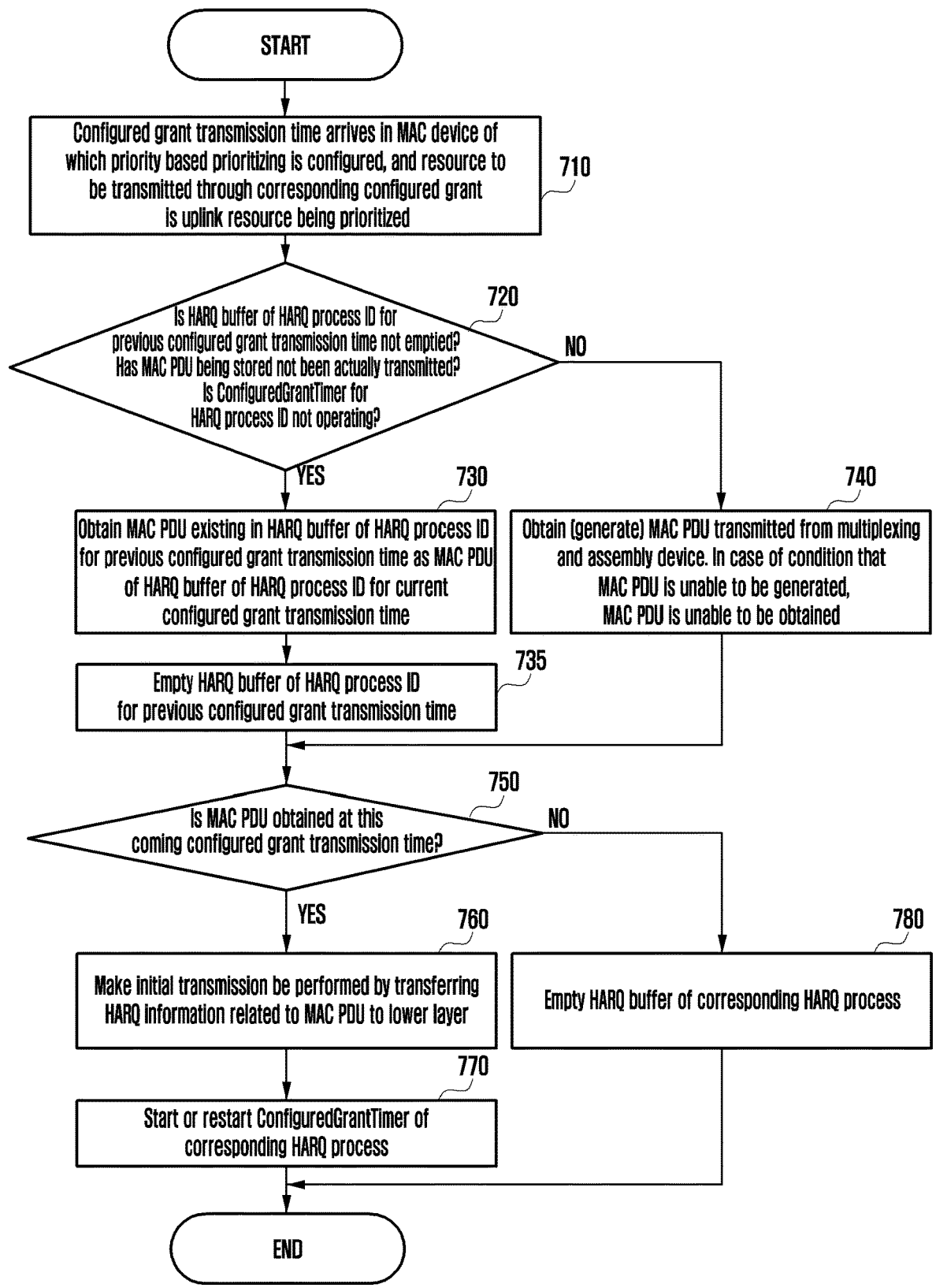
FIG. 7 illustrates a detailed procedure for transmitting data of a low priority in case of collision proposed according to an embodiment of the disclosure.

FIG. 7 illustrates a detailed procedure for transmitting data of a low priority in case of collision proposed according to the embodiment of the disclosure.

Referring to FIG. 7, as described above with reference to FIG. 6, it is considered to determine which resource is prioritized and transmitted based on the priority of the data to be transmitted on the corresponding resource when the resource collision occurs as described above with reference to FIG. 6. This may be called a priority based prioritizing, and it is considered that the configured grant transmission time arrives in such a priority based configured MAC device, and the resource to be transmitted in the corresponding configured grant is an uplink resource being prioritized 710. Here, the prioritized uplink resource means that resources overlapping on the time axis or on the time and frequency axes exist, but the configured grant has a high priority, and thus the resource can be transmitted. Also, in case that the resource overlapping on the time axis or on the time and frequency axes does not exist, this may become the uplink resource being always prioritized.

In this case, it may be confirmed whether the existing MAC PDU, which is obtained and stored in a state where the HARQ buffer of the HARQ process ID for the transmission time of the previous configured grant is not emptied within the same configured grant configuration, has not been actually transmitted, and whether ConfiguredGrantTimer for the HARQ process is not operating 720. Here, a case that the stored MAC PDU exists, but has not been actually transmitted may mean a case that the corresponding resource has a low priority and has not been transmitted after the obtaining of the MAC PDU. The ConfiguredGrantTimer may mean that the HARQ process has been used for retransmission or dynamic grant transmission. Further, the HARQ buffer at operation 720 may mean the HARQ buffer corresponding to the HARQ process ID at the transmission time of the corresponding configured grant. In a certain embodiment, at operation 720, a condition on which the retransmission resource has not been allocated to CS-radio network temporary identifier (RNTI) instead of the condition on which the ConfiguredGrantTimer for the corresponding HARQ process ID does not operate.

If the condition at operation 720 is satisfied, this means that the MAC PDU, having been unable to be transmitted in the configured grant of the HARQ process of the previous configured grant, exists, and in order to transmit the MAC PDU having been unable to be transmitted at this coming configured grant transmission time, it may be necessary to move the corresponding MAC PDU remaining in the HARQ buffer of the HARQ process ID for the previous configured grant transmission time into the HARQ buffer of the HARQ process ID for the current configured grant transmission time. For this, it may be possible to obtain (generate) the corresponding MAC PDU remaining in the HARQ buffer of the HARQ process ID for the previous configured grant transmission time as the MAC PDU of the HARQ buffer of the HARQ process ID for the current configured grant transmission time 730. Further, the HARQ buffer of the HARQ process ID for the previous configured grant transmission time may be emptied 735. If the HARQ buffer of the HARQ process ID for the previous configured grant transmission time is not emptied, retransmission for the HARQ process may be performed, and this may cause a problem that two HARQ processes perform duplicated retransmission. If the condition at operation 720 is not satisfied, the MAC PDU transmitted from a multiplexing and assembly device may be obtained. In this case, in case of the condition on which the MAC PDU is unable to be generated, the MAC PDU is unable to be obtained 740.

Thereafter, the terminal may confirm whether to obtain the MAC PDU at this coming configured grant transmission time (operation 750). If so, the terminal may perform an initial transmission by transferring the HARQ information related to the MAC PDU to a lower layer 760. Further, because the corresponding resource is the configured grant resource, the terminal may not perform the initial transmission of the same HARQ process by starting or restarting a ConfiguredGrantTimer of the corresponding HARQ process 770. If the operation 750 is not satisfied, this means that the MAC PDU is unable to be obtained at this time, and thus the data transmission is unable to be performed. This is why the HARQ buffer of the corresponding HARQ process may be emptied 780. The operation described in the embodiment of FIG. 7 may be limited to being performed within the same configured grant configuration.

Figure 8:
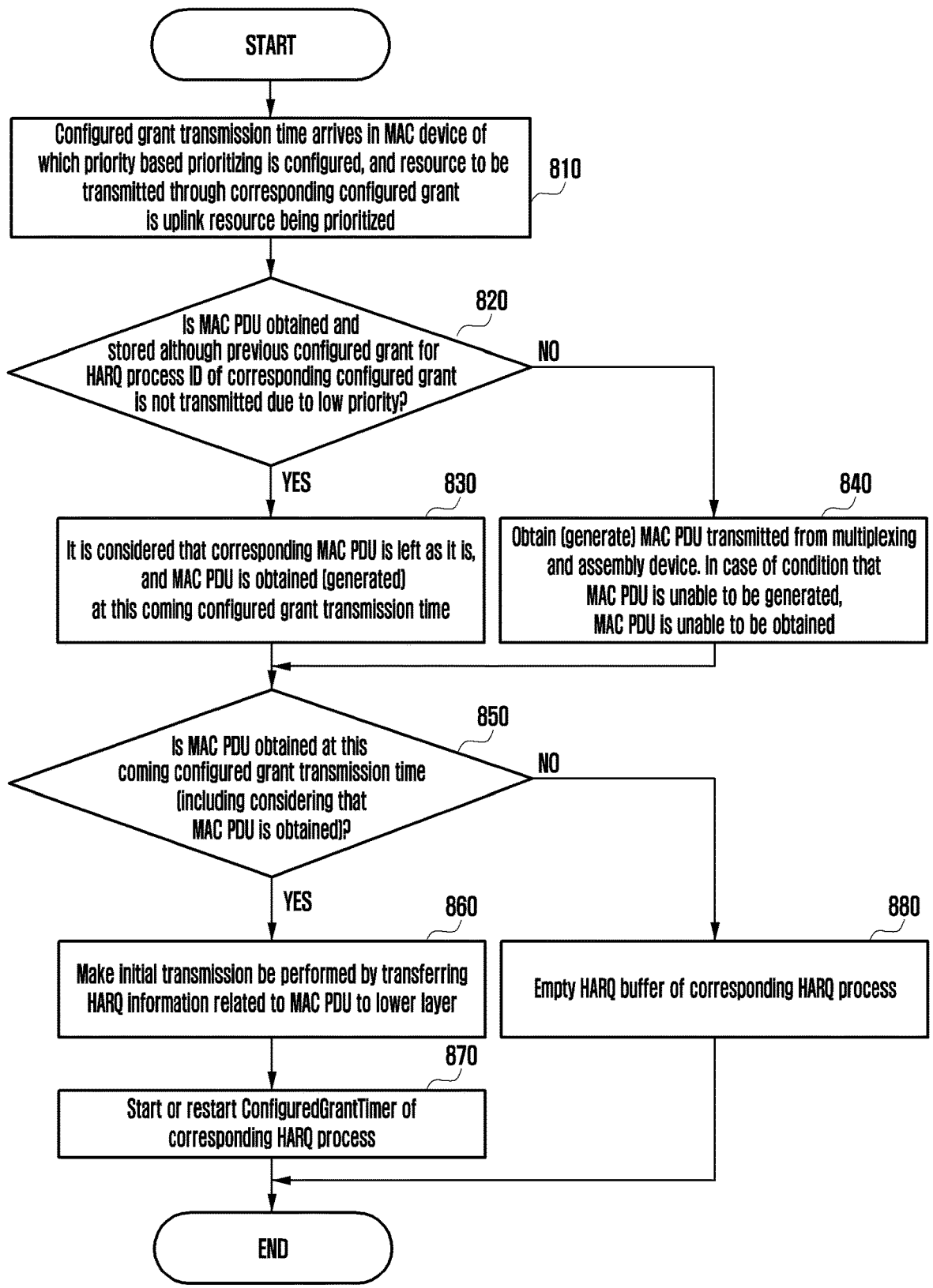
FIG. 8 illustrates a detailed procedure for transmitting data of a low priority in case of collision proposed according to an embodiment of the disclosure.

FIG. 8 illustrates a detailed procedure for transmitting data of a low priority in case of collision proposed according to the embodiment the disclosure.

Referring to FIG. 8, as described above with reference to FIG. 4, it is considered to determine which resource is prioritized and transmitted based on the priority of the data to be transmitted on the corresponding resource when the resource collision occurs. This may be called a priority based prioritizing, and it is considered that the configured grant transmission time arrives in such a priority based configured MAC device, and the resource to be transmitted in the corresponding configured grant is an uplink resource being prioritized 810. Here, the prioritized uplink resource means that resources overlapping on the time axis or on the time and frequency axes exist, but the configured grant has a high priority, and thus the resource can be transmitted. Also, in case that the resource overlapping on the time axis or on the time and frequency axes does not exist, this may become the uplink resource being always prioritized.

In this case, it may be confirmed whether the MAC PDU is obtained and stored although the previous configured grant for the corresponding HARQ process ID at the corresponding configured grant transmission time is determined to have a low priority and thus has not been transmitted (operation 820).

If the condition at operation 820 is satisfied, this means that the MAC PDU, having been unable to be transmitted in the configured grant of the same HARQ process, exists, and in order to transmit the MAC PDU having been unable to be transmitted at this coming configured grant transmission time, it may be considered that the corresponding MAC PDU remaining in the HARQ buffer is left as it is, and the MAC PDU is obtained (generated) at this coming configured grant transmission time 830. According to embodiments, it may be considered that the same MAC PDU is generated again, and through such an operation, it may be possible to transmit the corresponding MAC PDU at the subsequent operation. If the condition at operation 820 is not satisfied, the MAC PDU transmitted from a multiplexing and assembly device may be obtained. In this case, in case of the condition on which the MAC PDU is unable to be generated, the MAC PDU is unable to be obtained 840.

Thereafter, the terminal may confirm whether to obtain the MAC PDU at this coming configured grant transmission time. In this case, whether to obtain the MAC PDU may include a case in which it is considered that the MAC PDU is obtained at operation 830 850. If so, the terminal may perform an initial transmission by transferring the HARQ information related to the MAC PDU to a lower layer 860. Further, because the corresponding resource is the configured grant resource, the terminal may not perform the initial transmission of the same HARQ process by starting or restarting a ConfiguredGrantTimer of the corresponding HARQ process 870. If the operation 850 is not satisfied, this means that the MAC PDU is unable to be obtained at this time, and thus the data transmission is unable to be performed. This is why the HARQ buffer of the corresponding HARQ process may be emptied 880. The operation described in the embodiment of FIG. 8 may be limited to being performed within the same configured grant configuration. Further, the embodiment of FIG. 8 may be limitedly applied to a case in which the number of HARQ processes configured in the configured grant configuration is 1.

Figure 9:
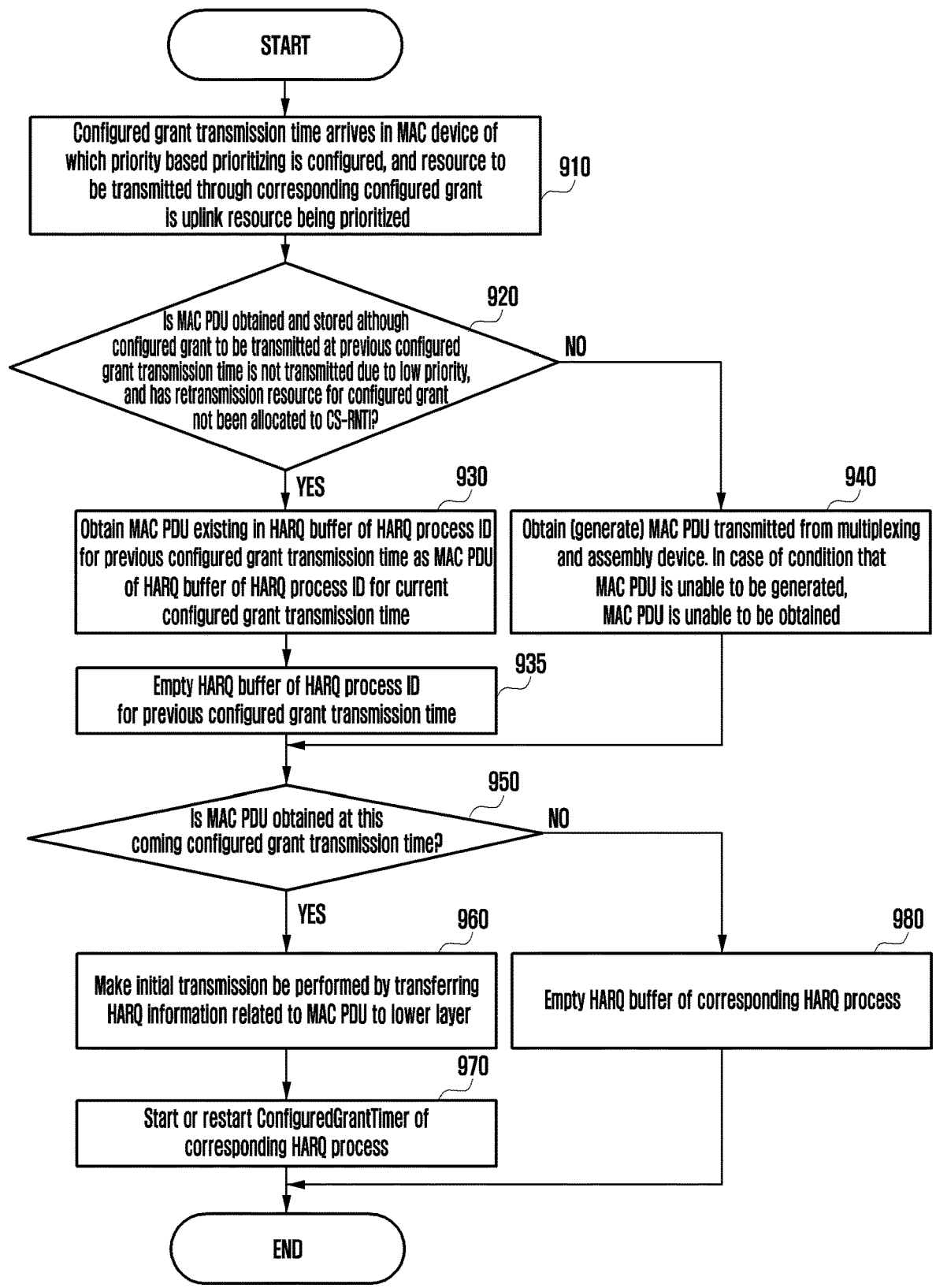
FIG. 9 illustrates a detailed procedure for transmitting data of a low priority in case of collision proposed according to an embodiment of the disclosure.

FIG. 9 illustrates a detailed procedure for transmitting data of a low priority in case of collision proposed according to the embodiment of the disclosure.

Referring to FIG. 9, as described above with reference to FIG. 6, it is considered to determine which resource is prioritized and transmitted based on the priority of the data to be transmitted on the corresponding resource when the resource collision occurs. This may be called a priority based prioritizing, and it is considered that the configured grant transmission time arrives in such a priority based configured MAC device, and the resource to be transmitted in the corresponding configured grant is an uplink resource being prioritized (operation 910). Here, the prioritized uplink resource means that resources overlapping on the time axis or on the time and frequency axes exist, but the configured grant has a high priority, and thus the resource can be transmitted. Also, in case that the resource overlapping on the time axis or on the time and frequency axes does not exist, this may become the uplink resource being always prioritized.

In this case, it may be confirmed whether the MAC PDU is obtained and stored although the configured grant to be transmitted at the previous configured grant transmission time is not transmitted due to the low priority, and whether the retransmission resource for the configured grant has not been allocated to CS-RNTI (operation 920). Instead of a condition that the retransmission resource at operation 920 has not been allocated to the CS-RNTI, a case that the ConfiguredGrantTimer for the corresponding HARQ process ID is not operating may be applied.

If the condition at operation 920 is satisfied, this means that the MAC PDU, having been unable to be transmitted in the configured grant of the HARQ process of the previous configured grant, exists, and in order to transmit the MAC PDU having been unable to be transmitted at this coming configured grant transmission time, it is necessary to move the corresponding MAC PDU remaining in the HARQ buffer of the HARQ process ID for the previous configured grant transmission time into the HARQ buffer of the HARQ process ID for the current configured grant transmission time. For this, it may be possible to obtain (generate) the corresponding MAC PDU remaining in the HARQ buffer of the HARQ process ID for the previous configured grant transmission time as the MAC PDU of the HARQ buffer of the HARQ process ID for the current configured grant transmission time 930. Further, the HARQ buffer of the HARQ process ID for the previous configured grant transmission time may be emptied 935. If the HARQ buffer of the HARQ process ID for the previous configured grant transmission time is not emptied, retransmission for the HARQ process may be performed, and this may cause a problem that two HARQ processes perform duplicated retransmission. If the condition at operation 920 is not satisfied, the MAC PDU transmitted from a multiplexing and assembly device may be obtained. In this case, in case of the condition on which the MAC PDU is unable to be generated, the MAC PDU is unable to be obtained 940.

Thereafter, the terminal may confirm whether to obtain the MAC PDU at this coming configured grant transmission time (operation 950). If so, the terminal may perform an initial transmission by transferring the HARQ information related to the MAC PDU to a lower layer 960. Further, because the corresponding resource is the configured grant resource, the terminal may not perform the initial transmission of the same HARQ process by starting or restarting a ConfiguredGrantTimer of the corresponding HARQ process 970. If the operation 950 is not satisfied, this means that the MAC PDU is unable to be obtained at this time, and thus the data transmission is unable to be performed. This is why the HARQ buffer of the corresponding HARQ process may be emptied (980). The operation described in the embodiment of FIG. 9 may be limited to being performed within the same configured grant configuration.

Figure 10:
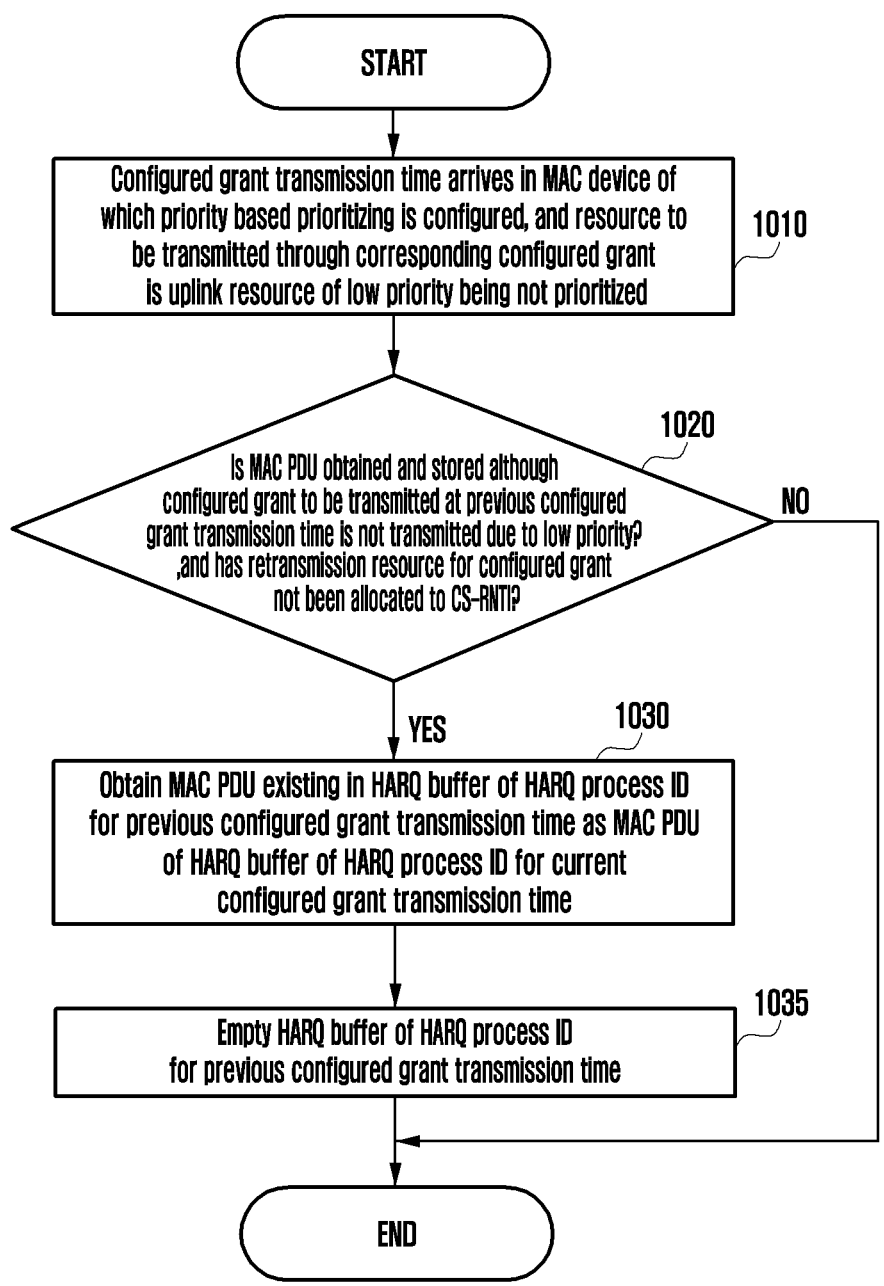
FIG. 10 illustrates a detailed procedure of a terminal for transmitting data of a low priority in case of collision proposed according to an embodiment of the disclosure.

FIG. 10 illustrates a detailed procedure for transmitting data of a low priority in case of collision proposed according to the embodiment of the disclosure.

Referring to FIG. 10, as described above with reference to FIG. 6, it is considered to determine which resource is prioritized and transmitted based on the priority of the data to be transmitted on the corresponding resource when the resource collision occurs. This may be called a priority based prioritizing, and it is considered that the configured grant transmission time arrives in such a priority based configured MAC device, and the resource to be transmitted in the corresponding configured grant is an uplink resource of a low priority, which has not been prioritized 1010. Here, the prioritized uplink resource means that resources overlapping on the time axis or on the time and frequency axes exist, but the configured grant has a high priority, and thus the resource can be transmitted. Also, in case that the resource overlapping on the time axis or on the time and frequency axes does not exist, this may become the uplink resource being always prioritized. Accordingly, the uplink resource of a low priority may mean that it is not the uplink resource being prioritized.

In this case, it may be confirmed whether the MAC PDU is obtained and stored although the configured grant to be transmitted at the previous configured grant transmission time is not transmitted due to the low priority, and whether the retransmission resource for the configured grant has not been allocated to CS-RNTI (operation 1020). Instead of a condition that the retransmission resource at operation 1020 has not been allocated to the CS-RNTI, a case that the ConfiguredGrantTimer for the corresponding HARQ process ID is not operating may be applied. In another embodiment, the condition at operation 1020 may be replaced by the condition at operation 720.

If the condition at operation 1020 is satisfied, this means that the MAC PDU, having been unable to be transmitted in the configured grant of the HARQ process of the previous configured grant, exists, and in order to transmit the MAC PDU having been unable to be transmitted at a different configured grant transmission time within the same configured grant configuration, it is necessary to move the corresponding MAC PDU remaining in the HARQ buffer of the HARQ process ID for the previous configured grant transmission time into the HARQ buffer of the HARQ process ID for the current configured grant transmission time. For this, it may be possible to obtain (generate) the corresponding MAC PDU remaining in the HARQ buffer of the HARQ process ID for the previous configured grant transmission time as the MAC PDU of the HARQ buffer of the HARQ process ID for the current configured grant transmission time 1030. Further, the HARQ buffer of the HARQ process ID for the previous configured grant transmission time may be emptied 1035. If the HARQ buffer of the HARQ process ID for the previous configured grant transmission time is not emptied, retransmission for the HARQ process may be performed, and this may cause a problem that two HARQ processes perform duplicated retransmission. The operation described in the embodiment of FIG. 10 may be limited to being performed within the same configured grant configuration.

Figure 11:
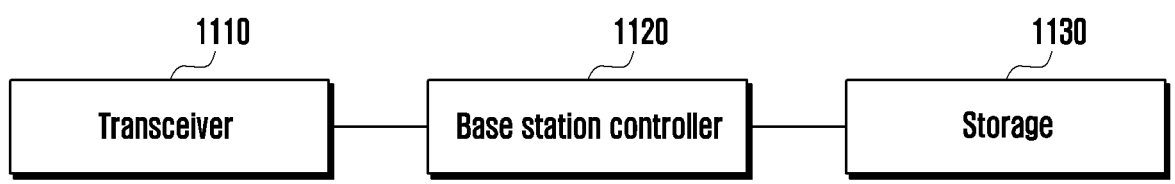
FIG. 11 is a diagram illustrating the structure of a base station according to an embodiment of the disclosure; and, FIG. 12 is a diagram illustrating the structure of a terminal according to an embodiment of the disclosure.

FIG. 11 is a diagram illustrating the structure of a base station according to an embodiment of the disclosure.

Reference to FIG. 11, a base station may include a transceiver 1110, a controller 1120, and a storage 1130. In the disclosure, the controller 1120 may be defined as a circuit or an application-specific integrated circuit or at least one processor.

The transceiver 1110 transmits and receives signals with another network entity. The transceiver 1110 may transmit, for example, system information to a terminal, and may transmit a synchronization signal or a reference signal.

The controller 1120 may control the overall operation of the base station according to an embodiment proposed in the disclosure. For example, the controller 1120 may control a signal flow between respective blocks to perform an operation according to the above-described flowchart.

The storage 1130 may store at least one of information being transmitted and received through the transceiver 1110 and information generated through the controller 1120.

Figure 12:
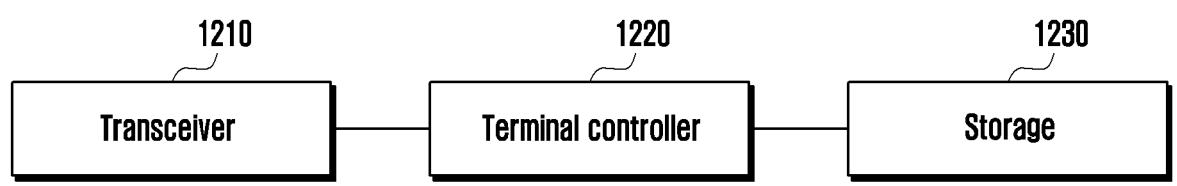

FIG. 12 is a block diagram illustrating the structure of a terminal according to an embodiment of the disclosure.

Reference to FIG. 12, a terminal may include a transceiver 1210, a controller 1220, and a storage 1230. In the disclosure, the controller 1220 may be defined as a circuit or an application-specific integrated circuit or at least one processor.

The transceiver 1210 transmits and receives signals with another network entity. The transceiver 1210 may receive, for example, system information from a base station, and may receive a synchronization signal or a reference signal.

The controller 1220 may control the overall operation of the terminal according to an embodiment proposed in the disclosure. For example, the controller 1220 may control a signal flow between respective blocks to perform an operation according to the above-described flowchart.

Specifically, the controller 1220 may confirm whether a first MAC PDU generated at a first timing is transmitted, and if the first MAC PDU is not transmitted at the first timing, the controller 1220 may control to consider that the first MAC PDU is generated at a second timing, and to transmit data corresponding to the first MAC PDU at the second timing based on the considering.

The storage 1230 may store at least one of information being transmitted and received through the transceiver 1210 and information generated through the controller 1220.

As described above, although the configured grant is the resource being used for the initial transmission in accordance with the operations of the terminal and the base station, and thus the MAC PDU should be obtained, it is possible to transmit the corresponding data even without obtaining of the MAC PDU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   receiving, from a base station, a radio resource control (RRC) message including configured grant configuration information;
   identifying a configured uplink grant being prioritized over another uplink grant based on the configured grant configuration information;
   identifying a hybrid automatic repeat request (HARQ) process associated with the configured uplink grant;
   considering that a medium access control (MAC) protocol data unit (PDU) to transmit has been obtained for the HARQ process, in case that a previous configured uplink grant for the HARQ process was not prioritized, the MAC PDU had already been obtained for the HARQ process, and a transmission of the obtained MAC PDU has not been completely performed; and
   transmitting, to the base station, the MAC PDU for the HARQ process based on the configured uplink grant, without obtaining the MAC PDU from an HARQ buffer of the HARQ process.

2. The method of claim 1, wherein the configured grant configuration information includes at least one of information on a frequency hopping, information on a modulation and coding scheme (MCS) table, information on a resource allocation type, information indicating whether a power control loop is used, information on a periodicity, information on a configured grant timer value, or information on a number of one or more HARQ processes.

3. The method of claim 2, further comprising starting or restarting a configured grant timer for the HARQ process based on the configured grant timer value.

4. A terminal in a communication system, the terminal comprising:
   a transceiver; and
   a controller configured to:
      receive, from a base station via the transceiver, a radio resource control (RRC) message including configured grant configuration information,
      identify a configured uplink grant being prioritized over another uplink grant based on the configured grant configuration information,
      identify a hybrid automatic repeat request (HARQ) process associated with the configured uplink grant,
      consider that a medium access control (MAC) protocol data unit (PDU) to transmit has been obtained for the HARQ process, in case that a previous configured uplink grant for the HARQ process was not prioritized, the MAC PDU had already been obtained for the HARQ process, and a transmission of the obtained MAC PDU has not been completely performed, and
      transmit, to the base station via the transceiver, the MAC PDU for the HARQ process based on the configured uplink grant, without obtaining the MAC PDU from an HARQ buffer of the HARQ process.

5. The terminal of claim 4, wherein the configured grant configuration information includes at least one of information on a frequency hopping, information on a modulation and coding scheme (MCS) table, information on a resource allocation type, information indicating whether a power control loop is used, information on a periodicity, information on a configured grant timer value, or information on a number of one or more HARQ processes.

6. The terminal of claim 5, wherein the controller is further configured to start or restart a configured grant timer for the HARQ process based on the configured grant timer value.

* * * * *